(No Model.)
G. H. SPENCER.
GRAPPLE.
No. 322,019. Patented July 14, 1885.
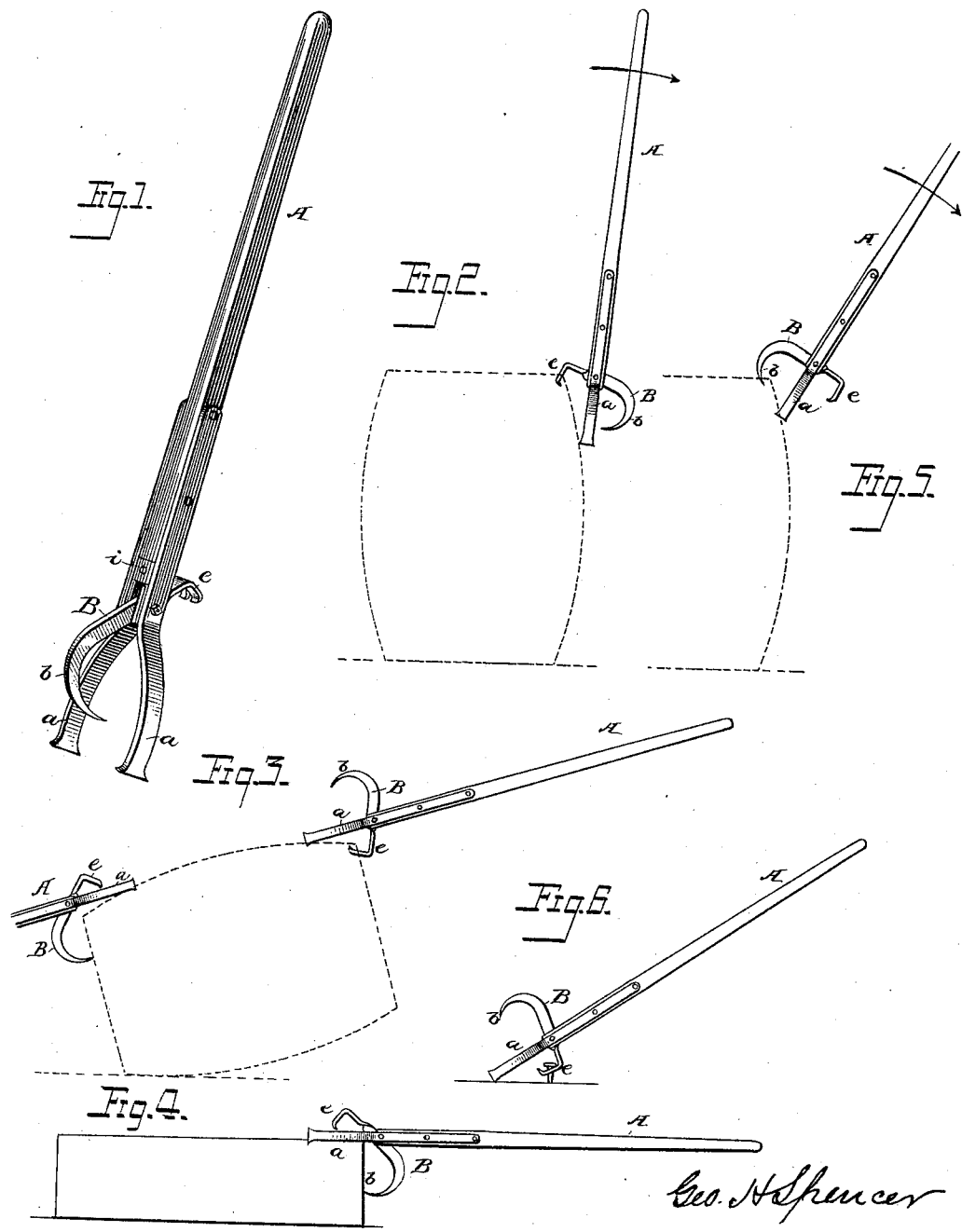

United States Patent Office.

GEORGE H. SPENCER, OF CHICAGO, ILLINOIS.

GRAPPLE.

SPECIFICATION forming part of Letters Patent No. 322,019, dated July 14, 1885.

Application filed December 15, 1884. (No model.)

*To all whom it may concern:*

Be it known that I, GEORGE H. SPENCER, a citizen of the United States, residing at Chicago, in the county of Cook and State of Illinois, have invented certain new and useful Improvements in Grapples, of which the following is a specification.

My invention is a grapple constructed, as fully described hereinafter, so as to be readily applied and fixed to barrels, boxes, and other articles for the purpose of facilitating the moving and transporting of the same.

In the drawings, Figure 1 is a perspective view of my improved grappling implement. Figs. 2, 3, and 4 are views illustrating the manner in which the grapple is used for moving barrels and boxes. Fig. 5 is a view illustrating the manner in which the implement is used for flagging barrels. Fig. 6 is a view illustrating the use of the implement in drawing spikes.

The shaft of the implement consists of a handle, A, and two forks or prongs, $a$ $a$, at one end of the shaft, separated so as to form a wide bearing. The handle may be of wood or metal, and the prongs may, when the handle is of metal, constitute a part thereof; or when it is of wood, as shown, they may consist of metallic straps bolted to the sides of the shaft, or otherwise secured in any suitable manner.

Between the prongs, at the point where they join the handle, is hung a dog, B, one end of which is formed into a hook, $b$, and the other into a divided claw, $e$, as shown, and the handle is provided with a metallic block or other bearing, $i$.

The implement above described is adapted for use in seizing and transporting various objects, and is especially intended for such use in connection with barrels and packages, as illustrated in the drawings. Thus when a barrel is to be moved the claw $e$ is applied to the chine, and the ends of the prongs are brought against the sides of the staves, as shown in Fig. 2, and the implement is drawn in the direction of the arrow, so as to carry the barrel to an inclined or horizontal position, and to then turn it to bring the implement uppermost, as shown in Fig. 3, when the barrel may be drawn or pushed readily to any desired point. When the barrel cannot be drawn upon the floor or other surface, it may be readily carried by applying two of the implements to the same, one at each end, so as to constitute handles, by means of which it may be lifted and transported.

When a box or other article having no rim or chine is to be moved, the dog B is thrown back so as to bear against the plate $i$, and the implement is then moved quickly, so as to force the end of the hook $b$ into the end of the box, the prongs $a$ bearing upon the sides thereof, as shown in Fig. 4, whereby the implement is securely fixed to the box, which may be then drawn or pushed or carried, as may be desired.

The implement may also be used as a flagging-iron, the hook $b$ being applied to the inside of the end of the stave, and the forks $a$ against the outer face of the latter, as shown in Fig. 5, and the handle being then moved in the direction of the arrow, so as to draw the stave to which the implement is applied out of line with the others.

As the claw $e$ is forked, it may be used to seize and draw spikes, in the manner illustrated in Fig. 6; but when it is not desired to use the implement for this purpose a plain undivided hook is employed, and in some cases the hook or claw may be altogether dispensed with, the dog consisting solely of the hook $b$.

To insure a better hold of the implement on the article, I prefer to provide each prong $a$ with a terminal lip or projection, $s$, which penetrates the side of the box or barrel as the pressure is applied.

Without limiting myself to the precise construction and arrangement of parts shown and described, I claim—

1. A grapple consisting of a shank having terminal prongs and a dog hung to the shank and curved at the end, substantially as set forth.

2. The combination of the shank having terminal prongs and a bearing, $i$, and a dog hooked and hung to the shank and arranged to swing back against the bearing, substantially as specified.

3. The combination, with a shank having terminal prongs, of a dog hung to the shank and hooked at the opposite ends, substantially as set forth.

4. The combination of the shank and dog hung thereto, having a hook, b, at one end, and a divided hook or claw, e, at the opposite end, substantially as described.

5. The shank consisting of a handle and metallic straps prolonged to form prongs a a, in combination with a dog hung to the shank and provided with hooked ends, substantially as specified.

6. The grapple consisting of a shank having prongs at one end, with terminal projections s, and a dog hung to the shank, substantially as described.

In testimony whereof I have signed my name to this specification in the presence of two subscribing witnesses.

GEORGE H. SPENCER.

Witnesses:
CHARLES E. FOSTER,
W. C. DUVALL.